US012770111B2

(12) United States Patent
Dange

(10) Patent No.: US 12,770,111 B2
(45) Date of Patent: Oct. 20, 2026

(54) SYSTEM AND METHOD FOR ENFORCING FACTUALITY ON DIGITAL COMMUNICATION PLATFORMS

(71) Applicant: Amod Ashok Dange, Mountain View, CA (US)

(72) Inventor: Amod Ashok Dange, Mountain View, CA (US)

(73) Assignee: Amod Ashok Dange, Mountain View, CA (US)

(*) Notice: Subject to any disclaimer, the term of this patent is extended or adjusted under 35 U.S.C. 154(b) by 126 days.

(21) Appl. No.: 18/638,965

(22) Filed: Apr. 18, 2024

(65) Prior Publication Data

US 2024/0354869 A1 Oct. 24, 2024

Related U.S. Application Data

(60) Provisional application No. 63/461,242, filed on Apr. 22, 2023.

(51) Int. Cl.
*G06Q 10/40* (2026.01)

(52) U.S. Cl.
CPC .................................... *G06Q 10/40* (2026.01)

(58) Field of Classification Search
CPC ...................................................... G06Q 50/01
See application file for complete search history.

(56) References Cited

U.S. PATENT DOCUMENTS 9,424,520 B1 * 8/2016 Chow ...................... G06F 16/36
2014/0164994 A1 * 6/2014 Myslinski ........... G06F 3/04817 715/808
2016/0307109 A1 * 10/2016 Myslinski ........... G06F 16/9538
2019/0012374 A1 * 1/2019 Petroni ................... G06F 9/542
2019/0213185 A1 * 7/2019 Arroyo ............... G06F 16/2428
2021/0133829 A1 * 5/2021 Coffing .............. G06Q 30/0282
2021/0149900 A1 * 5/2021 Kim ..................... G06F 16/3344
2022/0121720 A1 * 4/2022 Bayliss ................. G06F 16/958

* cited by examiner

*Primary Examiner* — Ken Hoang

(57) ABSTRACT

A system and method for enforcing factuality. The system receives content from a user for transmission over one or more platforms. The system computes a credibility score for the user and analyzes the content to validate claimed facts. The nature of the content is determined based on the claimed facts. Further, supplementary information is extracted from pre-approved external sources based on the content's ontological classification. Further, a similarity quotient is generated for the content by comparing the claimed facts with validated facts derived from the supplementary information. A veracity score is computed based on the user's credibility score and the content's similarity quotient. The content is approved when the veracity score meets a predetermined veracity threshold.

14 Claims, 3 Drawing Sheets

SYSTEM AND METHOD FOR ENFORCING FACTUALITY ON DIGITAL COMMUNICATION PLATFORMS

CROSS-REFERENCE TO RELATED APPLICATIONS AND PRIORITY

The present application claims priority from U.S. Provisional Application No. 63/461,242 titled "Method of Enforcing Factuality In A Composer" and dated Apr. 22, 2023.

TECHNICAL FIELD

The invention pertains to a system designed to combat the spread of disinformation on digital communication platforms. More specifically, the system is configured for enforcing factuality on digital communication platforms.

BACKGROUND

In the era of digital communication, social media platforms have become a primary source of information for many individuals. These platforms allow users to share and receive information in real-time, making them a powerful tool for communication.

However, this power also comes with significant challenges. One of the most pressing issues is the spread of disinformation or 'fake news'. Disinformation can have serious consequences, including influencing public opinion, inciting violence, and undermining trust in institutions. Despite the efforts of social media platforms to combat this issue, it remains a significant problem. Traditional methods of combating disinformation, such as manual fact-checking and user reporting, are often insufficient due to the volume of content and the speed at which it spreads. Furthermore, these methods often rely on subjective judgment, which can lead to inconsistencies and errors.

Therefore, there is a need for a more effective and efficient method of enforcing factuality on digital communication platforms.

SUMMARY

This summary is provided to introduce concepts related to a system for enforcing factuality on digital communication platforms and related methods thereof, and the concepts are further described below in the detailed description. This summary is not intended to identify essential features of the claimed subject matter nor is it intended for use in determining or limiting the scope of the claimed subject matter.

In accordance with embodiments, a system is provided for enforcing factuality on digital communication platforms. The system comprises a memory and a processor configured to execute programmed instructions stored in the memory. The processor may execute programmed instructions stored in the memory for receiving content at a composer engine, from a user device of a user, for posting over one or more social media platforms. The processor may execute programmed instructions stored in the memory for fetching a credibility score corresponding to the user. The processor may execute programmed instructions stored in the memory for analyzing the content to identify a set of alleged facts associated with the content. The processor may execute programmed instructions stored in the memory for identifying the nature of the content based on the set of alleged facts. The processor may execute programmed instructions stored in the memory for extracting supplementary information from a plurality of pre-approved external sources based on the nature of the content. The processor may execute programmed instructions stored in the memory for generating a similarity quotient corresponding to the content based on the comparison of the set of alleged facts with the supplementary information. The processor may execute programmed instructions stored in the memory for computing a veracity score based on the credibility score of the user and the similarity quotient corresponding to the content. Finally, the processor may execute programmed instructions stored in the memory for posting the content over one or more social media platforms, when the veracity score is greater than a predetermined veracity threshold.

In accordance with embodiments, a method is provided for enforcing factuality on digital communication platforms. The method comprises steps for receiving content at a composer engine, from a user device of a user, for posting over one or more social media platforms. The method comprises steps for fetching a credibility score corresponding to the user. The method comprises steps for analyzing the content to identify a set of alleged facts associated with the content. The method comprises steps for identifying the nature of the content based on the set of alleged facts. The method comprises steps for extracting supplementary information from a plurality of pre-approved external sources based on the nature of the content. The method comprises steps for generating a similarity quotient corresponding to the content based on the comparison of the set of alleged facts with the supplementary information. The method comprises steps for computing a veracity score based on the credibility score of the user and the similarity quotient corresponding to the content, Further, the method comprises steps for posting the content over one or more social media platforms, when the veracity score is greater than a predetermined veracity threshold.

BRIEF DESCRIPTION OF DRA WINGS

The detailed description is described with reference to the accompanying Figures. The same numbers are used throughout the drawings to refer to features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
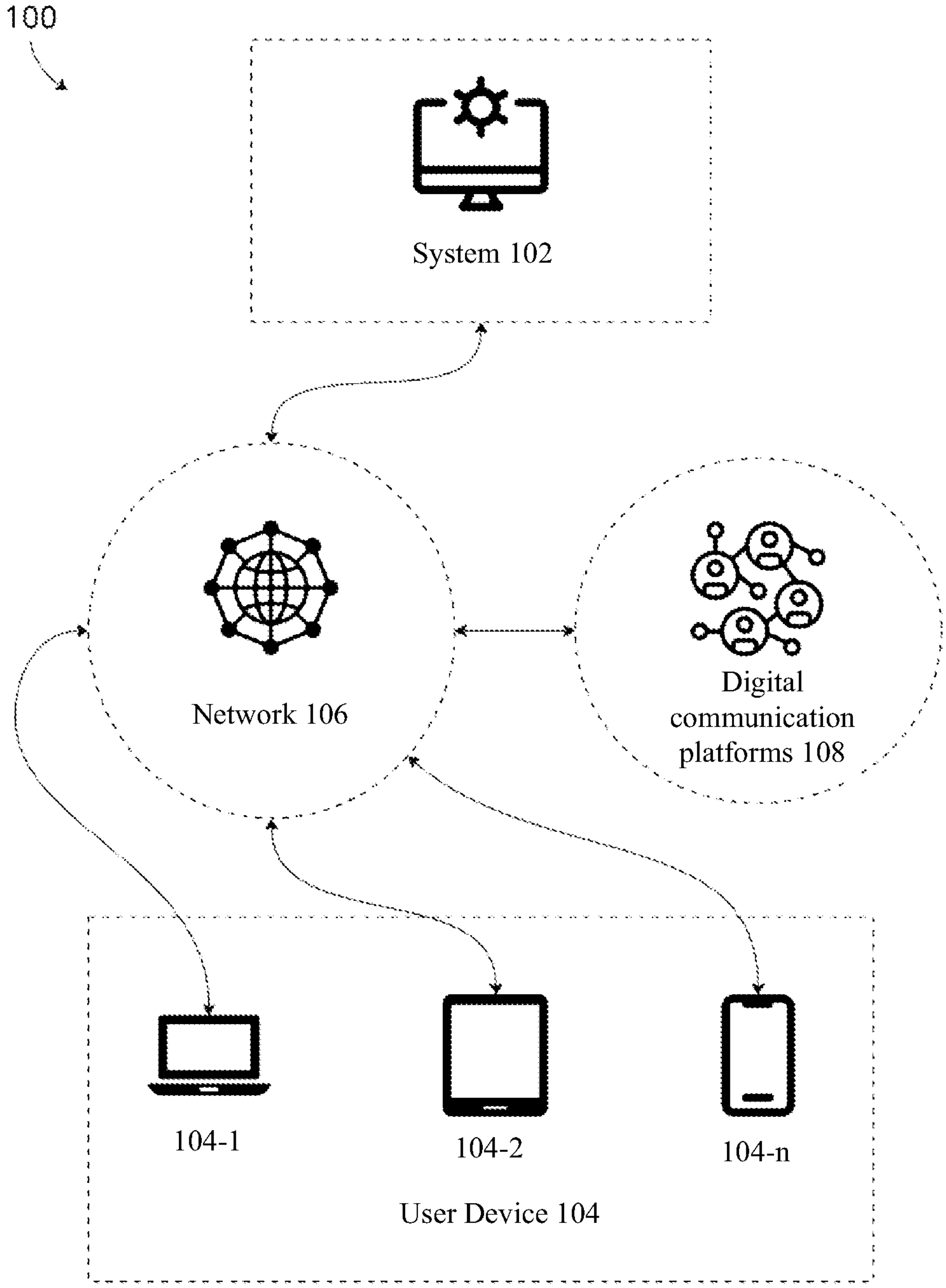
FIG. 1 illustrates a network implementation of a system for enforcing factuality on digital communication platforms, in accordance with an embodiment of the present disclosure.

Referring to FIG. 1, network implementation 100 of a system for enforcing factuality 102 (hereafter system 102) is illustrated, in accordance with an embodiment of the present subject matter. The factuality is enforced on communication between two or more people enabled through the one or more digital communication platforms 108 including media platforms, augmented reality platforms, virtual reality platforms, or any other digital communication platforms. The system 102 is designed to identify and mitigate the spread of false information on digital communication platforms such as social media platforms, chat applications, and the like. The system 102 this through a series of interconnected components and subcomponents hereinafter referred to as modules.

In one embodiment, the system 102 may comprise a processor and a memory. Further, the system 102 may be connected to user devices 104 or applications residing over the user devices 104 through a network 106. It may be understood that the system 102 may be communicatively coupled with the user through one or more user devices/applications 104-1, 104-2, . . . , 104-*n* collectively referred to as a user device 104.

In one embodiment, the network 106 may be a cellular communication network used by user devices 104 such as mobile phones, tablets, or a virtual device. In one embodiment, the cellular communication network may be the Internet. The user device 104 may be any electronic device, communication device, image capturing device, machine, software, automated computer program, a robot or a combination thereof. The system 102 may be configured to register users over the system 102. Further, the system 102 may be configured to authenticate the user, each time the user makes a request to access the system 102. In one embodiment, the user device 104 may be used by a user for posting content over one or more digital communication platforms 108 that are communicatively coupled to the system 102 through the network 106.

In one embodiment, the user devices 104 may support communication over one or more types of networks in accordance with the described embodiments. For example, some user devices and networks may support communications over a Wide Area Network (WAN), the Internet, a telephone network (e.g., analog, digital, POTS, PSTN, ISDN, xDSL), a mobile telephone network (e.g., CDMA, GSM, NDAC, TDMA, E-TDMA, NAMPS, WCDMA, CDMA-2000, UMTS, 3G, 4G), a radio network, a television network, a cable network, an optical network (e.g., PON), a satellite network (e.g., VSAT), a packet-switched network, a circuit-switched network, a public network, a private network, and/or other wired or wireless communications network configured to carry data. The aforementioned user devices 104 and network 106 may support wireless local area network (WLAN) and/or wireless metropolitan area network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.20x ("Mobile-Fi"), and others. The block diagram 200 of the system 102 for managing financial obligations is further illustrated in FIG. 2.

Figure 2:
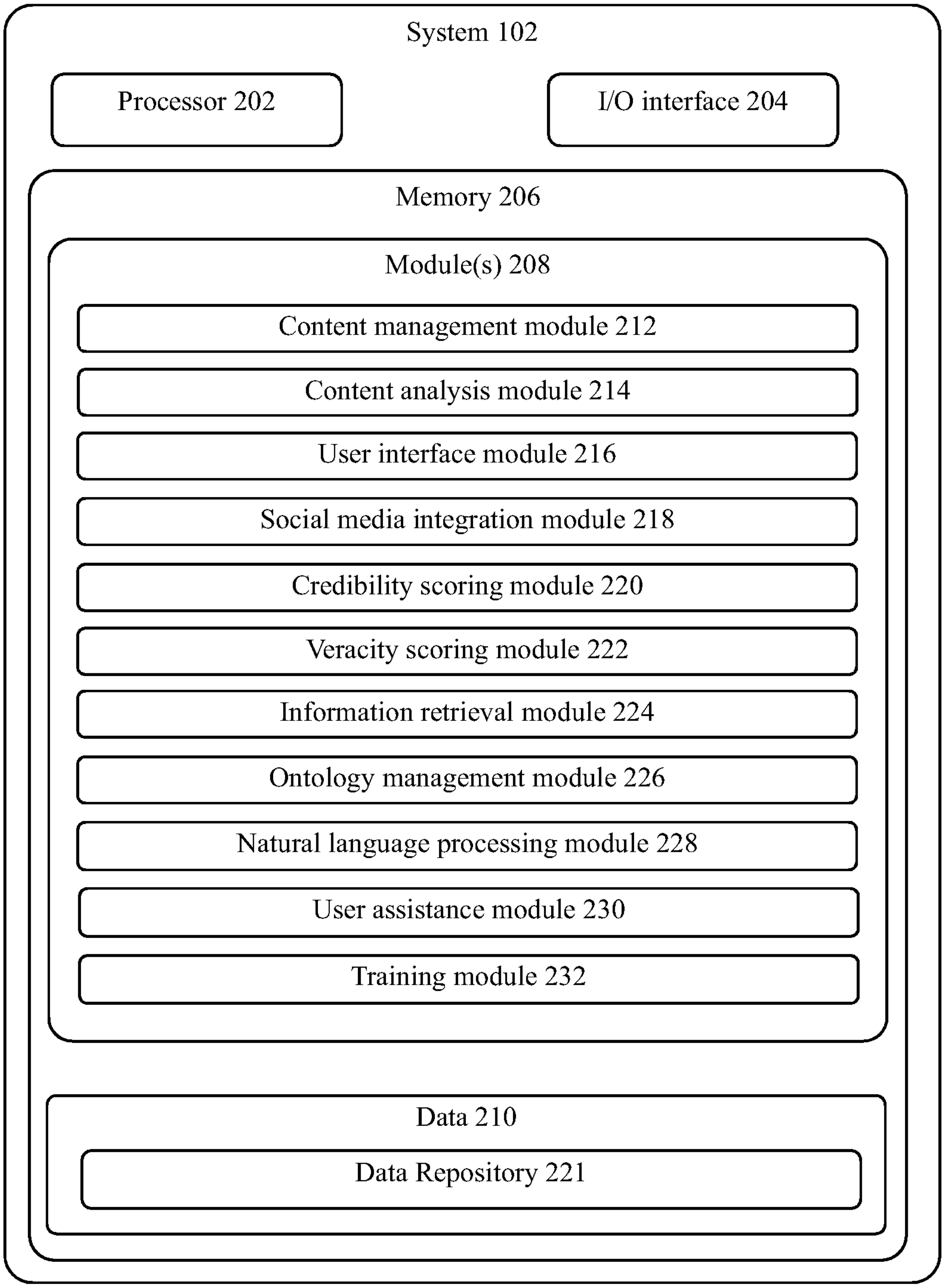
FIG. 2 illustrates a block diagram of the system for enforcing factuality on digital communication platforms, in accordance with an embodiment of the present disclosure.

Referring now to FIG. 2, various components of the system 102 are illustrated, in accordance with an embodiment of the present subject matter. As shown, the system 102 may include at least one processor 202, an I/O interface 204 and a memory 206. The memory 206 consists of programmed instructions corresponding to a set of modules 208 and data 210. The set of modules 208 may include a content management module 212, an analysis module 214, a user interface module 216, a social media integration module 218, a credibility scoring module 220, a veracity scoring module 222, an information retrieval module 224, an ontology management module 226, a natural language processing module 228, a user assistance module 230, and a training module 232.

In one embodiment, the at least one processor 202 is configured to fetch and execute computer-readable instructions, stored in the memory 204, corresponding to each of the modules 208. It must be noted that though the invention is explained considering that the system 102 is deployed over a remote server and the user device 104 is communicatively coupled with the system 102 through the network 106. However, it must be noted that the system 102 or modules 208 of the system 102 may also be deployed on the user device 104 itself and the modules 208 perform the same functions as that on the remote server using the local hardware of the user device 104. By implementing the system 102 on the user device 104, the data privacy of user's personal data is maintained as the data never leaves the user device 104.

In one embodiment, the memory 204 may include any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and memory cards.

In one embodiment, the programmed instructions may include routines, programs, objects, components, data structures, etc., which perform particular tasks, functions, or implement particular abstract data types. The data 210 may comprise a data repository 221, and other data. The other data amongst other things, serves as a repository for storing data processed, received, and generated by one or more components and programmed instructions. The working of the system 102 will now be described in detail referring to FIG. 2.

In one embodiment, when a user submits content to be shared through the one or more digital communication platforms 108, the system 102 receives this content from the user device 104 through the network 106. Further, the system 102 may enable a composer engine. The composer engine is a module within the system's infrastructure. The composer engine is the initial point of contact for content received from user devices 104, acting as a gateway for information flow into the system 102. The composer engine buffers the content, holding it in a transient state for processing. This is particularly relevant when the content is in non-text form, such as images, videos, or audio. The composer engine is configured to convert this content into plain text for further analysis.

Further, the system 102 is configured for fetching a credibility score corresponding to the user. The credibility score is updated periodically based on communication produced and shared by the user over the one or more the one or more digital communication platforms 108.

Further, the system 102 is configured for analyzing the content to identify a set of alleged facts associated with the content. The system 102 is also configured for identifying the nature of the content based on the set of alleged facts.

Further, the system 102 is configured for extracting supplementary information from a plurality of pre-approved external sources based on the nature of the content. The system 102 is also configured for generating a similarity quotient corresponding to the content based on the comparison of the set of alleged facts with the supplementary information.

Further, the system 102 is configured for generating a similarity quotient corresponding to the content based on the comparison of the set of alleged facts with the supplementary information.

Further, the system 102 is configured for computing a veracity score based on the credibility score of the user and the similarity quotient corresponding to the content.

Further, the system 102 is configured for posting the content over the one or more digital communication platforms 108, when the veracity score is greater than a predetermined veracity threshold.

Further, the system 102 is configured for discarding the content, when the veracity score is less than the predetermined veracity threshold. The predetermined veracity threshold is dynamically updated based on the nature of the content and the supplementary information. Further, the supplementary information is gathered from the pre-approved external sources in real-time. It must be noted that the credibility score is generated in real-time based on the veracity of historical content produced by the user and communicated over the one or more digital communication platforms 108 and made visible to other users on the one or more digital communication platforms 108. The credibility score is updated periodically based on recent communication produced and shared by the user over the one or more platforms 108.

In one embodiment, the system 102 is configured for identifying one or more genuine facts from the set of alleged facts based on comparison of the set of alleged facts with one or more validated facts identified from the supplementary information.

Once the one or more genuine facts are identified, the system 102 is configured for generating an updated content based on the one or more genuine facts and prompting the user to post the updated content over the one or more platforms.

In one embodiment, the system 102 is further configured for defining a set of concepts and categories corresponding to each domain from a set of domains, based on the properties associated with the set of concepts and categories and the correlation between the set of concepts and categories. Further, the system 102 is configured for creating sets of hierarchically structured objects that represent the concepts and categories. The composing one or more ontologies, each ontology comprising one or more sets of hierarchically structured objects.

In one embodiment, the system 102 is configured for generating a semantic reasoner. For the purpose of generating the semantic reasoner, the system 102 is configured for building standardized schemas based on the one or more ontologies. Further, the system 102 is configured for connecting the standardized schemas to create a superschema. Further, the system 102 is configured for building one or more graph databases based on nodes, edges, and properties associated with the superschema. Further, the system 102 is configured for building semantic Resource Description Framework (RDF) triples in a subject-predicate-object structure based on the one or more ontologies and superschema. Further, the system 102 is configured for storing the semantic (RDF) triples in the form of triplestores. The triplestores are updated by connecting curated data sources and periodically updating the data in the triplestores. Further, the system 102 is configured for linking descriptions of concepts and categories across the one or more ontologies, and linking objects in the triplestores across the one or more ontologies to build one or more knowledge graphs. The one or more knowledge graphs store interlinked descriptions of entities across the one or more ontologies. Finally, the system 102 is configured for generating the semantic reasoner by selecting a set of asserted facts or axioms present in a target triplestore from the triplestores, performing forward or backward chaining to traverse up and down the target triplestore, inferring logical consequences from the set of asserted facts or axioms, connecting logical consequences and inferences across multiple triplestores and across multiple ontologies, to extrapolate multi-dimensional conclusions.

In one embodiment, the system 102 is configured for rendering the composer engine. For the purpose of rendering the composer engine, initially, the system 102 as is configured for training a neural network on large quantities of unlabelled text using self-supervised learning, to produce a large language model. Further, the system 102 is configured for connecting the large language model to the triplestores. Further, the system 102 is configured for training the large language model to use a set of semantic triples and translating the set of semantic triples into conversational-style human language. Further, the system 102 is configured for training the large language model to use a content of conversational-style human language and to translate the content of conversational-style human language into semantic triples.

Once the composer engine is rendered, the composer engine is configured for creating a content buffer for buffering the content received from the user, wherein the content is in text form or non-text form. Further, the composer engine is configured for transforming the content into a format compatible with a large language model. Further, the composer engine is configured for transmitting the content from the content buffer to a large language modelling engine. The large language modelling engine is configured for transforming the content into a set of semantic RDF triples, generating RDF queries based on the set of semantic RDF triples, constructing an internal logic of the set of semantic RDF triples based on a semantic reasoner, traversing the RDF queries across multiple triplestores to extend the logical consequences of the RDF queries into the one or more knowledge graphs, generating graph database queries, executing the graph database queries to determine the similarity quotient based on the ontological classification, and determining the veracity score based on the similarity quotient and comparing the veracity score with the predetermined veracity threshold.

In one embodiment, the system 102 is further configured for rendering a prompt framework for receiving the content from the user. The content is received for validation of veracity of the content. Further, the prompt framework is configured for assisting the user in improving the veracity score of the content by displaying prompts to the user to ensure that the large language model has interpreted the content correctly, and receiving responses to the prompts from the user. It must be noted that after each response, the prompt framework is configured for labeling the content based on the response to assist the large language model in correctly interpreting the content.

In one embodiment, the system 102 is further configured for rendering a training platform. The training platform is configured for rendering a training model. The training model is configured to continuously learn from interactions between the user and the composer engine. Further, the training model is configured for running a feedback loop that continuously learns from the content submitted by the users and the feedback received from the composer engine. The training model is configured running a feedback loop that continuously teaches users to improve the content for achieving higher veracity scores, providing suggestions to the user on avoiding content that is likely to receive a lower veracity score, providing suggestions to the user on composing text that is likely to receive a higher veracity score, and teaching the large language model to distinguish between falsehoods and sarcasm, lies, and parody.

The working of the system 102 is now explained in detail with respect to the function of each of the modules 208. In one embodiment, the processor 202 executes programmed instructions stored within the memory 206, orchestrating the flow of data through various modules 208 designed for specific tasks.

In the first step, the content management module 212 is responsible for managing user-generated content, ensuring its credibility before the content is shared on one or more digital communication platforms 108. The content management module 212 begins by receiving content from the user device 104, targeted for posting on one or more digital communication platforms 108. The content, which may arrive in different formats such as text, images, videos, or audio, is buffered in a content buffer by a composer engine enabled by the content management module 212. When the content is in a non-text form, a conversion process is undertaken by the content management module 212 to extract plain text, which standardizes the content for further analysis.

Further, the content analysis module 214, analyzes the content to identify factual information and determine the nature of the content. The content analysis module 214 maintains the integrity of information disseminated through the system 102. Further, the content analysis module 214 examines the content to identify a set of alleged facts. The content analysis module 214 categorizes the content based on the set of alleged facts, which is crucial for the retrieval of supplementary information from external sources. These external sources may include real-time news feeds and databases that are pertinent to subject matter on the content.

Further, the user interface module 216 plays a role in the system 102 by managing interactions with users and their devices 104. The user interface module 216 is responsible for collecting content intended for publishing or sharing over the one or more digital communication platforms 108. The user interface module 216 is designed to handle various forms of user content, including text, images, videos, and audio. Non-text content is converted into text to facilitate analysis.

Initially, the content received by the user interface module 216 is stored in a content buffer, which serves as a temporary holding area. This ensures data integrity during the transition to the language modelling engine. The content is then forwarded to the language modelling engine, part of the Natural language processing module 228, where it is structured into semantic RDF triples. These triples are crucial for logical validation and interaction with the knowledge graph.

Additionally, the user interface module 216 includes a framework that interacts with users to improve content veracity. The user interface module 216 generates prompts for user input, which are used to refine the content's interpretation by the large language model. Metadata and tags are added based on user responses, aiding in the accurate assessment of content. The user interface module 216 ensures that user interactions are streamlined and that content is authenticated before being posted on digital communication platforms 108.

The social media integration module 218 is designed to interface with digital communication platforms 108, enabling the posting of content that has been evaluated for credibility. This social media integration module 218 becomes active when a user submits content through the user interface module 216, which collects the content from the user device 104.

The content management module 212 and the content analysis module 214 analyze the received content to identify a set of facts. Simultaneously, the credibility scoring module 220 calculates a credibility score based on the user's past posts and their influence on digital communication platforms 108. This credibility score, in conjunction with a similarity quotient derived from the comparison of the content's facts against supplementary information from external sources, is used by the veracity scoring module 222.

If the veracity score meets or exceeds a predetermined veracity threshold, the social media integration module 218 facilitates the posting of the content on the designated digital communication platforms 108. If the veracity score is below the predetermined veracity threshold, the content is not posted, and the threshold may be updated based on the content's nature and the supplementary information, which is gathered in real-time. This ensures that the system's response is attuned to the current context of information sharing.

Further, the credibility scoring module 220 is configured for assessing user trustworthiness to ensure content authenticity. The credibility scoring module 220 evaluates user reliability, influencing content dissemination based on real-time and historical data analysis.

The credibility scoring module 220 fetches the credibility score for each user attempting to post content on digital communication platforms 108. As stated earlier, the credibility score is a dynamic representation of the user's trustworthiness, derived from the veracity of their historical posts and their influence over other users. The credibility scoring module 220 updates the credibility score in real-time, ensuring that it reflects the most current behavior of the user.

In one embodiment, when a user submits content, the system 102 uses this credibility score as part of a multifaceted analysis to compute a veracity score for the content. The integration of the credibility score into the veracity score calculation serves to reflect the user's historical accuracy in content dissemination and as a measure of the potential impact of their content based on their social media influence.

The credibility scoring module 220 also updates the credibility score periodically, taking into account the user's most recent posts. This update is necessary for maintaining an accurate assessment of the user's credibility. It ensures that users who improve the quality of their posts over time can rebuild their credibility, while those who consistently share unreliable content have their scores adjusted accordingly.

By incorporating these measures, the credibility scoring module 220 plays a fundamental role in mitigating the spread of false information by scrutinizing the trustworthiness of content sources.

Further, the veracity scoring module 222 is a key component in the system 102 designed to enforce factuality. It functions by assessing the truthfulness of content intended for distribution on digital communication platforms 108. The veracity scoring module 222 generates a similarity quotient by comparing user-submitted content with supplementary information from external sources. This process evaluates how closely the content's alleged facts match verified data.

The veracity score is the result of combining the similarity quotient with the user's credibility score. The veracity score is calculated using current data from external sources, ensuring that the assessment is based on the latest information. The system uses this veracity score to decide if content should be posted on digital communication platforms 108. If the veracity score exceeds a predetermined threshold, the content is posted. If not, the content is withheld to prevent the spread of misinformation. It must be noted that the predefined veracity threshold itself is dynamic, adjusting to changes in the context and relevance of information.

Further, the information retrieval module 224 is designed to source external data that is essential in evaluating the truthfulness of content. This information retrieval module 224 is activated when a user submits content to be shared on digital communication platforms 108. The information retrieval module 224 retrieves relevant data from various external sources, ensuring that the information used for comparison is current and reflects the latest developments, such as recent news or trending topics. The purpose of retrieving data in real-time is to provide an up-to-date context for the content being examined and to aid in the creation of a similarity quotient. This similarity quotient measures the alignment between the content's alleged facts and verified information, which is a key factor in calculating the veracity score of the content. Furthermore, algorithms are employed to analyze the nature of the submitted content and guide the search for supplementary data. The fetched data is then compared against the set of alleged facts to identify genuine information. This process is vital for the system's ability to maintain accurate assessments of content shared on social media platforms, ensuring that it can withstand scrutiny in a constantly changing information environment.

The information retrieval module 224 extracts supplementary data from diverse sources, which is integral to determining content authenticity. This information retrieval module 224 is a component of a larger framework aimed at enforcing factuality by analyzing user-generated content and assessing its credibility before it is posted on social media platforms. The system's effectiveness hinges on its ability to gather and utilize real-time data from external sources, which corresponds to the nature of the content being scrutinized. This data is used to generate a similarity quotient by comparing the set of alleged facts within the content against the supplementary information. The resulting veracity score, which is computed based on the user's credibility score and the similarity quotient, dictates whether the content is posted or discarded, depending on whether it meets a predetermined veracity threshold.

Further, the ontology management module 226 is central to structuring and linking data, enabling the system 102 to assess content credibility and combat disinformation. The ontology management module 226 is configured for defining concepts and categories, creating structured objects, composing ontologies, building schemas and a superschema, creating graph database, RDF triple and triplestore management, one or more knowledge graphs construction, and generating a semantic reasoner.

The ontology management module 226 begins by establishing a framework of concepts and categories for various domains. This framework involves defining properties and relationships between concepts to accurately represent domain-specific knowledge. Hierarchically structured objects that represent these concepts and categories are then created. These objects are used to compose ontologies, structured representations of knowledge within each domain, enabling the system to interpret and organize information.

Standardized schemas based on these ontologies are developed and interconnected to form a superschema, guiding the creation of graph databases by the ontology management module 226.

These databases encapsulate relationships between data points as nodes and edges, enabling efficient data retrieval and analysis. Semantic RDF triples are constructed to represent data as subject-predicate-object expressions and are stored in triplestores, which are updated with curated data sources.

The one or more knowledge graph constructions is an interconnected network of data that provides an overview of the entities and their relationships across ontologies. These one or more knowledge graphs support the semantic reasoner, which uses logical inference techniques to derive new insights and conclusions from the data. By traversing the one or more knowledge graphs and applying reasoning algorithms, the system 102 validates content veracity and identifies disinformation patterns. Further, the ontology management module 226 executes the graph database queries to determine the similarity quotient based on the ontological classification and determines the veracity score based on the content similarity quotient and comparing the veracity score with the predetermined veracity threshold.

Further, the natural language processing module 228 plays a role in interpreting and generating human-like text, essential for the system's ability to assess and manage the veracity of information. This natural language processing module 228 manages the large language model and semantic triples, transforming conversational language into structured data and vice versa.

The natural language processing module 228 employs a large language model to interpret and generate text that mimics human communication. It converts content into a structured format, specifically semantic Resource Description Framework (RDF) triples. This process involves analyzing plain text to identify subjects, predicates, and objects, which are then encoded into RDF triples.

Once the content is structured, RDF queries are generated based on the set of semantic RDF triples. These queries validate the internal logic of the RDF triples, ensuring that the relationships and data represented are coherent. The natural language processing module 228 traverses these queries across multiple triplestores, databases for storing RDF triples. This traversal extends the logical consequences of the queries into the one or more knowledge graphs, a database that interlinks various pieces of information.

The natural language processing module 228 also validates the content by extrapolating conclusions based on the logical consequences derived from the RDF queries. This process is essential for determining the veracity score of the content, which is compared with the predetermined veracity threshold to decide whether the content should be posted on social media platforms. If the content meets or exceeds the predetermined veracity threshold, the content is allowed to be shared. Otherwise, the content is discarded or returned to the user for revision. This process operates in real-time, ensuring that the spread of disinformation is mitigated effectively.

For this purpose, the content is transmitted to a large language modelling engine enabled by the natural language processing module 228. This large language modelling engine uses a large language model to transform the content into semantic RDF triples. These triples are used to generate RDF queries, which validate the internal logic of the content. The large language modelling engine traverses these queries across multiple triplestores, integrating the content's logical consequences into a knowledge graph. This process leads to the determination of the veracity score, which is compared against a predetermined threshold to decide if the content should be posted on social media platforms or discarded.

The integration of these processes ensures that system 102 operates efficiently, analyzing and validating content to maintain the integrity of information on digital communication platforms 108.

Finally, if the content is rejected due to lower veracity score, the user assistance module 230 is designed for guiding users to improve the veracity of their content. This user assistance module 230 interacts directly with users, providing prompts and feedback to improve content credibility. The user assistance module 230 begins its operation by receiving content from users, which is designated for veracity validation. This step is where the content's truthfulness is first assessed before it can be disseminated over digital communication platforms 108. The user assistance module 230 then engages with the user to improve the content's veracity score by posing questions to ensure the large language model has accurately interpreted the content. This interaction serves as a learning input for the system 102, refining its understanding of human language.

Responses from the user are collected, which are used to append metadata and tags to the content. This process aids the large language model in deciphering the content more accurately, thereby enhancing the determination of the veracity score. The user assistance module 230 acts as a conduit between the user's initial content submission and the system's analytical engines, ensuring that the content is scrutinized for factual accuracy as well as contextual and interpretative clarity.

Further, the training module 232 enhances the accuracy and efficiency of the system 102 by improving its algorithms and user interactions. The user assistance module 230 enables a training platform and a neural network. The training platform utilizes user engagement data to refine the system's content evaluation process. The training platform operates on a feedback loop that learns from user-submitted content and the feedback received from the composer engine to advance its algorithms for determining the likelihood of content being disinformation. Additionally, it provides users with guidance in creating content that is more likely to be considered accurate, which in turn increases the overall veracity score of submissions.

Within the user assistance module 230, the neural network is trained on large volumes of unlabelled text through self-supervised learning. This training is directed at developing a language model that comprehends the subtleties of human language, including the ability to differentiate between sarcasm, lies, and parody. The language model is connected to the system's triplestores, enabling it to use semantic triples to convert between conversational human language and machine-readable formats. This approach ensures that the system 102 not only becomes better at identifying disinformation but also aids users in crafting factually accurate content.

Figure 3:
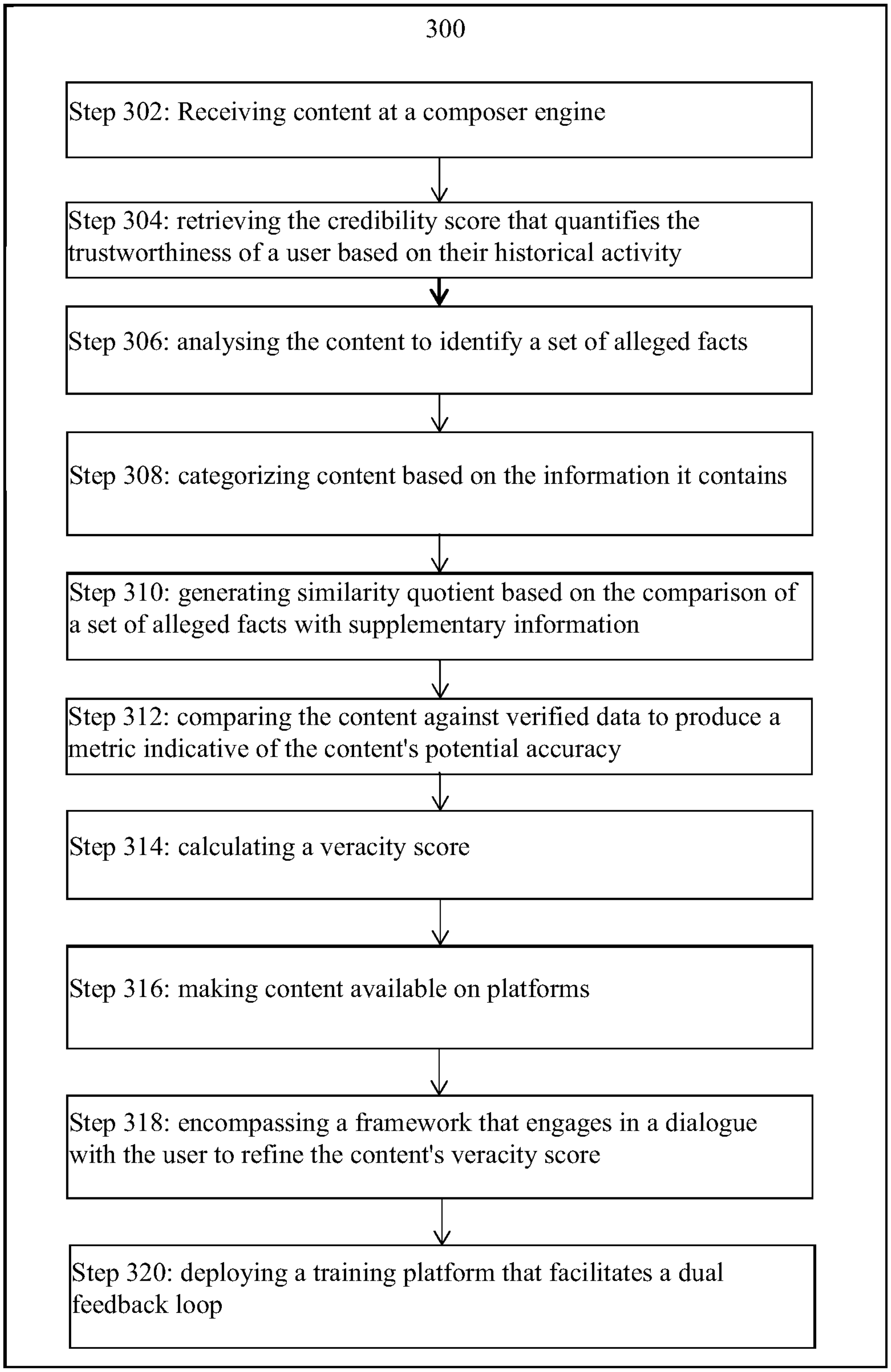
FIG. 3 illustrates a flowchart 300 for enforcing factuality on digital communication platforms, in accordance with an embodiment of the present disclosure.

Now referring to FIG. 3 illustrates a flowchart 300 for enforcing factuality on digital platforms, in accordance with an embodiment of the present disclosure.

At step 302 the content is received at a composer engine from the user device 104, which is intended by the user for posting over one or more digital communication platforms 108. The composer engine serves as the interface for content submission, accepting and buffering the content provided by the user through the user device 104, which can be in various forms such as text, images, videos, or audio. The user device 104 refers to any electronic device that the user uses to interact with the composer engine.

The user is the individual or entity that generates or forwards the content for dissemination on the one or more digital communication platforms 108.

The sub-steps within step 302 are manifested as follows:

The composer engine, upon receiving the content submission request, activates a content buffer, which is a temporary storage area within the memory 206 that holds the content received from the user until it is processed. This buffering manages the flow of data and ensures that the system 102 can handle multiple content submissions simultaneously without data loss or corruption.

If the content is in a non-text form, the system 102 processes this content and transforms the content into a format such as plain text that is compatible with the large language model. This conversion is necessary because the subsequent analysis of the content for veracity assessment relies on text-based processing. The conversion process may involve techniques such as optical character recognition for images, speech-to-text for audio, and video analysis for extracting textual information from videos. The purpose of these actions is to prepare the content for a series of analyses and veracity checks that follow in subsequent steps. By ensuring that the content is correctly received and converted into a processable format, the system 102 sets the stage for a factuality enforcement mechanism. The components involved in this step, including the composer engine, content buffer, and user device 104, work together to facilitate the intake of content into the system 102.

Further, step 304 involves the system 102 accessing a database or scoring mechanism to retrieve the credibility score that quantifies the trustworthiness of a user based on their historical activity on the one or more digital communication platforms 108. This credibility score reflects the user's reputation for posting accurate information. The system 102 may enable a scoring algorithm that determines the credibility score in real-time based on veracity of historical content produced by the user and communicated over the one or more digital communication platforms 108 and also the influence of the user over other users on the one or more social media platforms. The credibility score may be updated periodically. The system 102 may retrieve the credibility score to assess the likelihood that the new content submitted by the user is truthful. This credibility score is used to compute the veracity score of the content, which determines whether the content will be posted or not.

In other embodiment, the system 102 periodically accessing and analyzing the user's latest posts to update the credibility score that reflects the user's trustworthiness. The system 102 evaluates these posts for their truthfulness and adjusts the credibility score accordingly. This update allows the system 102 to adapt to changes in the user's posting behavior, which could indicate a change in the reliability of the information they share.

The credibility score is generated and updated, taking into account the accuracy of historical content posted by the user and their interactions with other users on the platforms. The score may include factors such as the accuracy of past posts, the user's engagement with other users, and the impact of their content on the community. The goal of step 304 is to maintain an accurate assessment of each user's potential to spread disinformation, enabling the system 102 to make informed decisions about the content they attempt to post.

Further, step 306, involves analysing the content to identify a set of alleged facts. In order to identify the set of alleged facts, the system 102 examines the content to extract statements that are presented as factual (i.e. the set of alleged facts associated with the content). This step is necessary to distinguish between factual and non-factual elements within the content. The processor, in conjunction with the memory 206 and the composer engine, parses the content, which may include text, images, videos, or audio, to discern individual pieces of information that are purported to be facts. This parsing may involve natural language processing techniques or image recognition capabilities, depending on the form of the content.

Further, step 306 also involves comparing the identified set of alleged facts with verified data to determine the genuineness of these facts. The system 102 cross-references the extracted facts with data from pre-approved external sources to validate the set of alleged facts. This comparison and validation process aims to separate facts that are supported by evidence from those that are not. The processor uses the nature of the content, to fetch relevant supplementary information, which is then used in this validation process. The purpose of step 306 is to enhance the accuracy of the content by ensuring that only facts supported by evidence are considered for further action. This step is integral to the system's goal of promoting the dissemination of accurate information.

At step 308 the system 102 categorizes content based on the information it contains. This categorization is derived from the facts presented within the content. For example, if the facts are related to a scientific discovery, the system 102 would categorize the content under a scientific domain. The categorization is carried out by the system 102, which analyzes the text to determine its thematic or topical classification. The system 102 may utilize natural language processing techniques to understand the semantics and context of the text, assigning it to predefined domains. This step is necessary for guiding the system 102 in selecting relevant pre-approved external sources for supplementary information. The relevance of the supplementary information is essential for generating an accurate similarity quotient, which in turn influences the computation of a veracity score. The categorization also affects the dynamic updating of a predetermined threshold, as different types of content may have varying levels of susceptibility to misinformation, necessitating different thresholds. The system may process the content, using machine learning models that recognize patterns and classify the content. These machine learning models consider the presence of specific keywords, the context of their use, and the structure of the content to assign it to the appropriate category. This process is automated, relying on the system's logic and learned patterns to categorize the content accurately.

Further, step 310 involves a process where the system 102 retrieves additional data from various sources based on the content's characteristics. Initially, the system 102 determines the characteristics of the content by examining the facts presented within it. This categorization guides the selection of sources for further information. The system 102 then selects sources that are likely to contain relevant data. These sources vary and could include online platforms that provide updates related to the subject matter of the content. The selection is guided by the previously determined characteristics of the content.

Following the selection, the system 102 extracts data from these sources. This involves querying the sources to retrieve data pertinent to the content's characteristics. The extraction process may utilize application programming interfaces (APIs) or web scraping techniques.

Once the data is extracted, it must be structured to allow for comparison with the facts presented in the content. This involves organizing the data into a format that the system's analysis tools can process. The extraction process is designed to operate in a timely manner, ensuring that the data reflects the most current state of knowledge or news regarding the topic. This timely operation is essential for the system's function of assessing the truthfulness of the content's presented facts.

By gathering this data, the system 102 may assess the truthfulness of the content by comparing it with the extracted data. This comparison contributes to the generation of a metric that quantifies the degree of similarity between the content's facts and the extracted data. This metric is then used in the calculation of the credibility score that represents the likelihood of the content being truthful. If this credibility score exceeds a certain threshold, the content is allowed to be posted on social media platforms. If not, the content is withheld to prevent the spread of misinformation.

Further, at step 310, a similarity quotient is generated based on the comparison of a set of alleged facts with supplementary information. This step is a computational process executed by the system 102, that compares the set of alleged facts extracted from the user's content with supplementary information retrieved from various external sources. These pre-approved external sources are selected based on the previously identified nature of the content, ensuring that the supplementary information is relevant.

The similarity quotient is a numerical value that represents the degree of correspondence between the user's alleged facts and the information from external sources. A higher similarity quotient indicates a greater level of agreement between the two sets of data, suggesting that the content is more likely to be accurate, while a lower similarity quotient would signal potential discrepancies. The process of generating the similarity quotient may involve algorithms and techniques such as text comparison, data matching, or semantic analysis, depending on the content, the structure of the alleged facts, and the format of the supplementary information.

The outcome of step 312, i.e. the similarity quotient, is then used in conjunction with the user's credibility score to compute the overall veracity score of the content. This veracity score is pivotal in determining whether the content will be posted on digital communication platforms 108 or discarded based on whether it meets the predetermined veracity threshold, which is dynamically updated.

In summary, step 312 is a data analysis process that involves the comparison of the content against verified data to produce a metric indicative of the content's potential accuracy. This step is integral to the system's ability to assess the integrity of information before it is disseminated on social media platforms.

At step 314 the system 102 calculates a veracity score. This score is derived from two metrics: a credibility score and a similarity quotient. The credibility score is a numerical representation of a user's trustworthiness based on their historical content and influence over others on social media platforms. The similarity quotient measures how closely the alleged facts in the user's content match supplementary information from external sources.

The purpose of this step is to evaluate the accuracy of the content. The veracity score is compared against a predetermined veracity threshold that is updated based on the content's nature and the supplementary information. If the veracity score exceeds the predetermined veracity threshold, the content is allowed to be posted on social media platforms. If the veracity score falls below the predetermined veracity threshold, the content is not posted, serving as a measure to prevent the dissemination of misinformation.

The computation of the veracity score involves integrating the credibility score and the similarity quotient. This integration is achieved through algorithms that may use various statistical methods to combine these two metrics into a single score.

At step 314, it is assumed that the credibility score and the similarity quotient are readily available and have been determined accurately in preceding steps. The system 102 also requires access to the predefined veracity threshold, which is subject to change, reflecting the evolving context and reliability of the supplementary information.

In essence, step 314 is the step where the system 102 uses the user's historical reliability and the content's consistency with external data to compute a score that dictates whether the content is shared on social media platforms or withheld to mitigate the spread of false information.

Further, the step 316 involves the process of making content available on social media platforms, contingent upon the content meeting the predefined veracity threshold that indicates its likelihood of being truthful. This step is the result of a sequence of analyses designed to mitigate the dissemination of false information.

The actions involved in Step 316 are as follows:

1.  Posting the Content : This action is performed by the composer engine, which uses application programming interfaces (APIs) to publish the content on various platforms. The content is posted because it has passed the necessary validations and is deemed to have met the threshold for truthfulness.
2.  Veracity Score Assessment : The system assesses a veracity score that reflects the likelihood of the content's truthfulness. The veracity score is derived from a combination of the user's historical accuracy and influence, and a measure of how closely the content's alleged facts align with verified information from external sources.
3.  Predetermined Veracity Threshold : This threshold is a benchmark that the content's veracity score must exceed for the content to be posted. This benchmark is dynamically updated to adapt to different contexts and the evolving landscape of information, as indicated in Step 314.
4.  Comparison with the Threshold : The system compares the veracity score with the predetermined veracity threshold. If the veracity score is greater than the predetermined veracity threshold, the content is allowed to be posted. This comparison serves as a gatekeeping mechanism to ensure that only content with a high likelihood of being truthful is disseminated.

Further, the composer engine executes programmed instructions to interact with digital communication platforms 108. The composer engine uses APIs to post content after a series of validations. The score is calculated using algorithms that consider the user's score and the content's similarity to trusted information.

The goal of Step 316 is to ensure that system 102 allows only verified and credible content to reach the public, thereby reducing the dissemination of false information. This step represents the final decision point in the content validation process, directly impacting what information is shared on digital communication platforms 108.

Further, step 318 encompasses a framework that engages in a dialogue with the user to refine the content's veracity score. This step begins with the reception of content from the user. The content is subject to validation processes, and its format can vary, including text, images, videos, or audio. The system 102 processes these formats to extract information for subsequent analysis. The framework communicates with the user to guide them on enhancing the credibility of their content. This may involve suggesting modifications or providing feedback on the content's current veracity score. To ensure accurate interpretation of the user's content, the system 102 may pose questions related to the content. These questions aim to gather additional context and clarify the intent behind the content, aiding in the accurate assessment of its veracity. User responses to the system's prompts are essential as they provide further context and clarification. These responses assist in refining the system's understanding and analysis of the content. Based on the user's responses, the system 102 annotates the content with metadata and tags. This annotation enriches the data representation of the content, facilitating a more precise interpretation and assessment of its veracity.

The framework in step 118 is designed to involve the user in the verification process of their content, enhancing the accuracy of the content and educating the user on the significance of sharing accurate information. The interactive process ensures that the content undergoes scrutiny and validation before potential dissemination, thereby contributing to the mitigation of disinformation spread.

Further, step 320 encompasses the deployment of a training platform that facilitates a dual feedback loop between the system's language model and users. The training platform is designed to analyze content submitted by users, identify areas that can be improved, and provide feedback to enhance the accuracy of future submissions. The feedback loop directed at the system 102 allows for the refinement of algorithms based on user interactions and content analysis. This iterative process enables the system 102 to adapt and improve its ability to assess content veracity.

Concurrently, the training platform engages users by offering guidance to avoid composing content that aligns with higher veracity standards. This user-directed feedback loop aims to educate users on effective content creation practices that are more likely to meet the system's veracity criteria. The training platform also focuses on enhancing the language model's proficiency in interpreting content that contains nuanced expressions such as sarcasm, lies, and parody. This is achieved by training the model to recognize and understand the subtleties and implied meanings within the content.

The training platform operates through a user interface that facilitates interaction and learning. It employs data analysis algorithms to process content and generate feedback. The language model's learning mechanisms are integral to the training platform, enabling continuous improvement in content assessment and interpretation.

In summary, the step 320 involves the following processes:

1. Deploying the training platform: Setting up an environment for interaction and learning between the system and users.

2. Analyzing user-submitted content: Processing content to identify areas for improvement and adapting system algorithms.
3. Educating users: Providing feedback and guidance to users on content composition to meet veracity standards.
4. Enhancing language model proficiency: Training the model to accurately interpret nuanced expressions within content.

These processes are implemented through the system's interface, algorithms, and the language model's learning capabilities, ensuring that the platform contributes to the overarching goal of maintaining content accuracy.

Although implementations for the system 102 and the method 300 for preventing spread of disinformation, have been described in language specific to structural features and methods, it must be understood that the claims are not limited to the specific features or methods described. Rather, the specific features and methods are disclosed as examples of implementations for the system 102 and the method 300 for preventing spread of disinformation.

The invention claimed is:

1. A system for enforcing factuality, the system comprising:

a memory; and a processor, wherein the processor is configured to execute programmed instructions stored in the memory for:

receiving content at a composer engine, from a user device of a user, for posting over one or more digital communication platforms;

fetching a credibility score corresponding to the user;

analyzing the content to identify a set of alleged facts associated with the content;

identifying a nature of the content based on the set of alleged facts;

extracting supplementary information from a plurality of pre-approved external sources based on the nature of the content;

generating a similarity quotient corresponding to the content based on comparison of the set of alleged facts with the supplementary information;

computing a veracity score based on the credibility score of the user and the similarity quotient corresponding to the content; and posting the content over the one or more digital communication platforms, when the veracity score is greater than a predetermined veracity threshold, wherein the composer engine is configured for:

creating a content buffer for buffering the content received from the user, wherein the content is in text form or non-text form, transforming the content into a format compatible with a large language model, transmitting the content from the content buffer to a large language modelling engine, wherein the large language modelling engine is configured for:

transforming the content into a set of semantic Resource Description Framework (RDF) triples, generating RDF queries based on the set of semantic RDF triples, constructing an internal logic of the set of semantic RDF triples based on a semantic reasoner, traversing the RDF queries across triplestores to extend logical consequences of the RDF queries into one or more knowledge graphs, generating graph database queries, executing the graph database queries to determine the similarity quotient based on ontological classification, and determining the veracity score based on the similarity quotient and comparing the veracity score with the predetermined veracity threshold.

2. The system as claimed in claim 1, wherein the factuality is enforced on communication between two or more people enabled through the one or more digital communication platforms including media platforms, augmented reality platforms, virtual reality platforms, or any other digital communication platforms.

3. The system as claimed in claim 1 is further configured for discarding the content, when the veracity score is less than the predetermined veracity threshold, wherein the predetermined veracity threshold is dynamically updated based on the nature of the content and the supplementary information, wherein the supplementary information is gathered from the plurality of pre-approved external sources in real-time, and wherein the credibility score is generated in real-time based on veracity of historical content produced by the user and communicated over the one or more digital communication platforms and made visible to other users on the one or more digital communication platforms.

4. The system as claimed in claim 1 is further configured for identifying one or more genuine facts from the set of alleged facts based on comparison of the set of alleged facts with one or more validated facts identified from the supplementary information.

5. The system as claimed in claim 4 is further configured for generating updated content based on the one or more genuine facts and prompting the user to post the updated content over the one or more digital communication platforms.

6. The system as claimed in claim 1, wherein the credibility score is updated periodically based on recent communication produced and shared by the user over the one or more digital communication platforms.

7. The system as claimed in claim 1 is further configured for:

defining a set of concepts and categories corresponding to each domain from a set of domains, based on properties associated with the set of concepts and categories, and correlation between the set of concepts and categories;

creating sets of hierarchically structured objects that represent the set of concepts and categories; and composing one or more ontologies, each ontology comprising one or more sets of hierarchically structured objects.

8. The system as claimed in claim 7 is further configured for:

building standardized schemas based on the one or more ontologies, and connecting the standardized schemas to create a superschema.

9. The system as claimed in claim 8 is further configured for:

building one or more graph databases based on nodes, edges, and properties associated with the superschema.

10. The system as claimed in claim 9 is further configured for:

building the set of semantic Resource Description Framework (RDF) triples in a subject-predicate-object structure based on the one or more ontologies and superschema, storing the set of semantic (RDF) triples in the form of the triplestores, wherein the triplestores are updated by connecting curated data sources and periodically updating data in the triplestores.

11. The system as claimed in claim 10 is further configured for:

linking descriptions of concepts and categories across the one or more ontologies, linking objects in the triplestores across the one or more ontologies to build the one or more knowledge graphs, wherein the one or more knowledge graphs store inter-linked descriptions of entities across the one or more ontologies.

12. The system as claimed in claim 11 is further configured for generating the semantic reasoner by:

selecting a set of asserted facts or axioms present in a target triplestore from the triplestores, performing forward or backward chaining to traverse up and down the target triplestore, inferring the logical consequences from the set of asserted facts or axioms, connecting the logical consequences and inferences across the triplestores and across the one or more ontologies, to extrapolate multi-dimensional conclusions.

13. The system as claimed in claim 12 is further configured for:

training a neural network on large quantities of unlabeled text using self-supervised learning, to produce the large language model, connecting the large language model to the triplestores, training the large language model to use the set of semantic RDF triples and translating the set of semantic RDF triples into a content of conversational-style human language, training the large language model to use the content of conversational-style human language and to translate the content of conversational-style human language into the set of semantic RDF triples.

14. A method for enforcing factuality, the method comprising steps of:

receiving content at a composer engine, from a user device of a user, for posting over one or more social media platforms;

fetching a credibility score corresponding to the user;

analyzing the content to identify a set of alleged facts associated with the content;

identifying a nature of the content based on the set of alleged facts;

extracting supplementary information from a plurality of pre-approved external sources based on the nature of the content;

generating a similarity quotient corresponding to the content based on comparison of the set of alleged facts with the supplementary information;

computing a veracity score based on the credibility score of the user and the similarity quotient corresponding to the content; and posting the content over one or more social media platforms, when the veracity score is greater than a predetermined veracity threshold, wherein the composer engine is configured for:

creating a content buffer for buffering the content received from the user, wherein the content is in text form or non-text form, transforming the content into a format compatible with a large language model, transmitting the content from the content buffer to a large language modelling engine, wherein the large language modelling engine is configured for:

transforming the content into a set of semantic Resource Description Framework (RDF) triples, generating RDF queries based on the set of semantic RDF triples, constructing an internal logic of the set of semantic RDF triples based on a semantic reasoner, traversing the RDF queries across triplestores to extend logical consequences of the RDF queries into one or more knowledge graphs, generating graph database queries, executing the graph database queries to determine the similarity quotient based on ontological classification, and determining the veracity score based on the similarity quotient and comparing the veracity score with the predetermined veracity threshold.

* * * * *